(12) United States Patent
Daloia

(10) Patent No.: US 11,905,189 B2
(45) Date of Patent: Feb. 20, 2024

(54) METHOD OF REFINING AND RECOVERING BARIUM SULFATE FROM CONTAMINATED WATER SOURCES

(71) Applicant: Chad Daloia, Washington, PA (US)

(72) Inventor: Chad Daloia, Washington, PA (US)

( * ) Notice: Subject to any disclaimer, the term of this patent is extended or adjusted under 35 U.S.C. 154(b) by 338 days.

(21) Appl. No.: 16/403,664

(22) Filed: May 6, 2019

(65) Prior Publication Data
US 2019/0345046 A1 Nov. 14, 2019

Related U.S. Application Data

(60) Provisional application No. 62/669,429, filed on May 10, 2018.

(51) Int. Cl.
| | | |
|---|---|---|
| *C02F 1/52* | (2023.01) |
| *C01F 11/46* | (2006.01) |
| *C02F 101/10* | (2006.01) |
| *C02F 1/66* | (2023.01) |
| *C02F 103/10* | (2006.01) |

(52) U.S. Cl.
CPC .......... *C02F 1/5236* (2013.01); *C01F 11/462* (2013.01); *C01P 2004/61* (2013.01); *C01P 2006/10* (2013.01); *C02F 1/66* (2013.01); *C02F 2101/101* (2013.01); *C02F 2103/10* (2013.01)

(58) Field of Classification Search
CPC .................................................... C02F 1/5236
See application file for complete search history.

(56) References Cited

U.S. PATENT DOCUMENTS

| | | |
|---|---|---|
| 4,119,700 A | 10/1978 | Stone |
| 4,588,574 A | 5/1986 | Felder et al. |
| 4,806,331 A | 2/1989 | Adams, Jr. et al. |
| 4,888,161 A | 12/1989 | Adams, Jr. et al. |
| 4,980,135 A | 12/1990 | Porta |
| 5,660,735 A | 8/1997 | Coltrinari et al. |
| 6,478,971 B1 | 11/2002 | Koefod et al. |
| 6,913,742 B2 | 7/2005 | Okajima |
| 7,001,582 B2 | 2/2006 | Hardinghaus et al. |
| 7,081,204 B2 | 7/2006 | Bandorick et al. |
| 7,501,110 B2 | 3/2009 | Amirzadeh-Asl et al. |
| 8,420,215 B2 | 4/2013 | Vogler et al. |
| 8,529,155 B2 | 9/2013 | DiTommaso et al. |
| 8,535,538 B1 | 9/2013 | Keeling et al. |
| 8,894,966 B2 | 11/2014 | Yang et al. |
| 9,221,697 B2 | 12/2015 | Keister |
| 9,284,206 B2 | 3/2016 | Presutti |
| 9,505,639 B2 | 11/2016 | Wahid |
| 9,580,343 B2 | 2/2017 | Keister |
| 9,643,865 B2 | 5/2017 | Matherly et al. |
| 9,719,179 B2 | 8/2017 | Marcin et al. |
| 9,808,738 B2 | 11/2017 | Duesel, Jr. et al. |
| 9,815,716 B2 | 11/2017 | Miller |
| 2003/0124048 A1 | 7/2003 | Hardinghaus et al. |
| 2015/0023865 A1 | 1/2015 | Castillo Gallegos |
| 2015/0218020 A1* | 8/2015 | Miller ................ C02F 1/5281 210/724 |
| 2017/0073255 A1 | 3/2017 | Vidic |
| 2017/0217802 A1 | 8/2017 | Kostedt, IV et al. |
| 2017/0334752 A1 | 11/2017 | Behrens |
| 2018/0009991 A1* | 1/2018 | Gantenbein ........... C01F 11/185 |

OTHER PUBLICATIONS

Walton et al.; The Nature of the Variable Hydration of Precipitated Barium Sulfate; Journal of the American Chemical Society; vol. 68; (9); (1946); pp. 1750-1753.

Walton et al.; The Contamination of Precipitated Barium Sulfate by Univalent Cations; Journal of the American Chemical Society; vol. 68; (9); (1946); pp. 1742-1750.

Cafiero et al.; Process Intensification: Precipitation of Barium Sulfate Using a Spinning Disk Reactor; Ind. Eng. Chem. Res .; vol. 41; (21); (2002); pp. 5240-5246; (Abstract Only).

Mallanna et al.; Preparation of mesostructured barium sulfate with high surface area by dispersion method and its characterization; Journal of Colloid and Interface Science; vol. 316; Issue 2; (Dec. 15, 2007); pp. 645-651; (Abstract Only).

* cited by examiner

*Primary Examiner* — Peter Keyworth
(74) *Attorney, Agent, or Firm* — Michael D. Lazzara; Leech Tishman Fuscaldo & Lampl, LLC

(57) ABSTRACT

The present invention relates to methods of refining and recovering barium sulfate from contaminated water sources that include barium cation, such as hydrofracture wastewater. The methods of the present invention result in the formation of a refined and a recovered barium sulfate that has a density of at least 4.10 g/ml, and a content of calcium ion of less than or equal to 250 mg/Kg.

18 Claims, No Drawings

METHOD OF REFINING AND RECOVERING BARIUM SULFATE FROM CONTAMINATED WATER SOURCES

CROSS REFERENCE TO RELATED APPLICATION

The present application is entitled to and claims priority to U.S. Provisional Patent Application No. 62/669,429, filed on May 10, 2018, the disclosure of which is incorporated herein by reference in its entirety.

FIELD

The present invention relates to methods of refining and recovering barium sulfate from contaminated water sources that include barium cation, such as hydrofracture wastewater.

BACKGROUND

Hydraulic fracturing (also referred to as fracking and hydrofracturing) can be used to obtain natural gas and/or oil from underground wells. For example, in the case of natural gas, typically a well is initially drilled using mud drilling water that includes barium sulfate. The barium sulfate used in the mud drilling water typically must meet American Petroleum Institute (API) specifications, such as a density of at least 4.10 g/ml, a content of calcium ion ($Ca^{2+}$) of less than or equal to 250 mg/Kg, and certain particle size thresholds. With the wellbore drilled and established, hydraulic fracturing water is injected down the well under pressure. The high pressure water is believed to penetrate into cracks and/or form cracks in underground rock formations, such as Marcellus shell formations, which results in the flow of natural gas out of the rock formation and up the wellbore. Such hydraulic fracturing operations result in the formation of hydrofracture waste water, which includes hydrofracture flowback water and hydrofracture produced water. Hydrofracture flowback water is injected water that returns to the surface up through the wellbore. Hydrofracture produced water is water that is produced along with the natural gas over the life of the well.

Hydrofracture wastewater typically contains high levels of total dissolved solids, for example, ranging from 70,000 to 250,000 gm/L. Impurities present in the hydrofracture wastewater include various ions, such as barium, strontium, calcium, sulfates, and chlorides. Prior to reuse and/or discharge into a body of water, such as a stream, the hydrofracture wastewater must be treated to reduce the amount of impurities below established threshold levels. Barium is typically removed from hydrofracture wastewater in the form of barium sulfate. The barium sulfate removed from the hydrofracture wastewater is typically disposed of in landfills.

It would be desirable to develop new methods of treating contaminated water sources that include barium cation, such as hydrofracture wastewater, so as to result in the recovery of barium sulfate having at least sufficient purity that allows it to be reused, such as in drilling mud compositions, coating compositions, and polymer molding compositions, rather than disposed of, such as in a landfill.

SUMMARY

In accordance with the present invention, there is provided a method of recovering barium sulfate from a contaminated water source, in which the method comprises: (a) providing the contaminated water source, wherein the contaminated water source comprises barium cation; (b) providing a source of sulfate ion; (c) combining together the contaminated water source and the source of sulfate ion, thereby forming a modified contaminated water source; (d) forming precipitated barium sulfate within the modified contaminated water source, thereby forming a further modified contaminated water source; (e) isolating precipitated barium sulfate from the further modified contaminated water source, thereby forming isolated precipitated barium sulfate; (f) dewatering the isolated precipitated barium sulfate, thereby forming a low-moisture precipitated barium sulfate; (g) exposing the low-moisture precipitated barium sulfate to an elevated temperature, thereby forming a refined barium sulfate having a density of at least 4.10 g/ml, and a content of calcium ion ($Ca^{2+}$) of less than or equal to 250 mg/Kg; and (h) subjecting the refined barium sulfate to particle size reduction and/or particle size classification, thereby forming a recovered barium sulfate.

In accordance with the present invention, there is further provided a method of recovering barium sulfate from a contaminated water source, in which the method comprises: (a) providing the contaminated water source, wherein the contaminated water source comprises barium cation; (b) providing a source of sulfate ion; (c) combining together the contaminated water source and the source of sulfate ion, thereby forming a modified contaminated water source; (d) forming precipitated barium sulfate within the modified contaminated water source, thereby forming a further modified contaminated water source; (e) isolating precipitated barium sulfate from the further modified contaminated water source, thereby forming isolated precipitated barium sulfate; (f) dewatering the isolated precipitated barium sulfate, thereby forming a low-moisture precipitated barium sulfate; (g) combining the low-moisture precipitated barium sulfate with clean water, thereby forming a slurry comprising precipitated barium sulfate; (h) subjecting the slurry comprising precipitated barium sulfate to density separation, thereby forming a refined barium sulfate having a density of at least 4.10 g/ml, and a content of calcium ion ($Ca^{2+}$) of less than or equal to 250 mg/Kg; and (i) subjecting the refined barium sulfate to particle size reduction and/or particle size classification, thereby forming a recovered barium sulfate.

In accordance with the present invention, there is additionally provided a method of recovering barium sulfate from a contaminated water source, in which the method comprises: (a) providing the contaminated water source, wherein the contaminated water source comprises barium cation; (b) providing a source of sulfate ion; (c) combining together the contaminated water source and the source of sulfate ion, thereby forming a modified contaminated water source; (d) forming precipitated barium sulfate within the modified contaminated water source, thereby forming a further modified contaminated water source; (e) isolating precipitated barium sulfate from the further modified contaminated water source, thereby forming a slurry comprising isolated precipitated barium sulfate; (f) subjecting the slurry comprising isolated precipitated barium sulfate to density separation, thereby forming high gravity precipitated barium sulfate; (g) dewatering the high gravity precipitated barium sulfate, thereby forming a refined barium sulfate having a density of at least 4.10 g/ml, and a content of calcium ion ($Ca^{2+}$) of less than or equal to 250 mg/Kg; and (h) subjecting the refined barium sulfate to particle size reduction and/or particle size classification, thereby forming a recovered barium sulfate.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DETAILED DESCRIPTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

All documents, such as but not limited to issued patents and patent applications, referred to herein, and unless otherwise indicated, are to be considered to be "incorporated by reference" in their entirety.

As used herein, the term "hydrofracture" relates to hydraulic fracturing. As used herein the term "hydrofracture wastewater" means wastewater that results from hydraulic fracturing processes. As used herein, the term "hydrofracture flowback water" means flowback water that results from hydraulic fracturing processes. As used herein, the term "hydrofracture production (or produced) water" means production (or produced) water that results from hydraulic fracturing processes.

As used herein, the term "lotic water" means flowing surface water, including, but not limited to, spring water, stream water, and/or river water.

The method of the present invention can be conducted as a batch process, a continuous process, or a combination of a batch process and continuous process. With some embodiments, each step of the method of the present invention can independently be conducted as a batch step, a continuous step, or a combination thereof.

The method of the present invention includes providing a contaminated water source that includes barium cation, which can be represented as $Ba^{2+}$. The amount of barium cation present in the contaminated water source can vary widely. With some embodiments, the amount of barium cation present in the contaminated water source is from 1 mg/L to 40,000 mg/L. The contaminated water source typically includes one or more other cations, which include, but are not limited to: strontium (such as in an amount of from 1 mg/L to 40,000 mg/L); calcium (such as in an amount of from 1 mg/L to 100,000 mg/L); magnesium (such as in an amount of from 1 mg/L to 40,000 mg/L); and/or iron (such as in an amount of from 50 mg/L to 150 mg/L).

With some embodiments of the present invention, the contaminated water source is a hydrofracture wastewater. With some further embodiments of the present invention, the hydrofracture wastewater is selected from hydrofracture flowback water, hydrofracture production water, and combinations of hydrofracture flowback water and hydrofracture production water.

The method of the present invention includes providing a source of sulfate ion. With some embodiments of the present invention, the source of sulfate ion is selected from particulate alkali metal sulfate, aqueous alkali metal sulfate, acid mine drainage comprising alkali metal sulfate, and combinations thereof. The particulate alkali metal sulfate is, with some embodiments, a solid particulate alkali metal sulfate. The aqueous alkali metal sulfate includes, with some embodiments, water to which alkali metal sulfate has been added, and in which the alkali metal sulfate is at least partially dissolved. The aqueous alkali metal sulfate is typically prepared by mixing water (such as clean water, such as lotic water, city water, well water, and/or deionized water) with alkali metal sulfate. As used herein, the terms "aqueous alkali metal sulfate" and "acid mine drainage comprising alkali metal sulfate" are distinguishable from each other and do not represent a genus and species. The acid mine drainage comprising alkali metal sulfate, with some embodiments, can be obtained from a mine, such as an active coal mine and/or an abandoned coal mine.

The alkali metal of the alkali metal sulfate can be selected from lithium, sodium, potassium, and combinations thereof. The alkali metal, with some embodiments, is sodium, and the alkali metal sulfate is sodium sulfate, which can be represented by the formula $Na_2SO_4$.

With some embodiments, the source of sulfate ion includes an amount of sulfate ion that is at least sufficient to result in precipitation of at least 90% by weight of barium cation, based on total weight of barium cation present in the contaminated water source, as precipitated barium sulfate. With some further embodiments, the source of sulfate ion includes an amount of sulfate ion that is at least sufficient to result in precipitation of at least 95% by weight, or at least 98% by weight, or at least 99% by weight of barium cation, based on total weight of barium cation present in the contaminated water source, as precipitated barium sulfate. With some additional embodiments, the source of sulfate ion includes an amount of sulfate ion that is at least sufficient to result in precipitation of 100% by weight of barium cation, based on total weight of barium cation present in the contaminated water source, as precipitated barium sulfate.

Based on the amount of barium cation present in the contaminated water source, the sulfate ion can be added in an amount that is: less than stoichiometric (such as less than one mole of sulfate ion $SO4^{2-}$ to one mole of barium cation $Ba^{2+}$); stoichiometric (such as one mole of sulfate ion $SO4^{2-}$ to one mole of barium cation $Ba^{2+}$); or a stoichiometric excess (such as more than one mole of sulfate ion $SO4^{2-}$ to one mole of barium cation $Ba^{2+}$).

The method of the present invention includes combining together the contaminated water source and the source of sulfate ion, which results in the formation of a modified contaminated water source. The contaminated water source and the source of sulfate ion can be combined together in accordance with art-recognized methods. With some embodiments, combining together the contaminated water source and the source of sulfate ion also involves concurrently or sequentially mixing the two together. For purposes of non-limiting illustration, the contaminated water source and the source of sulfate ion can be combined together in: a mixing tank that includes a method of circulation, such as tangentially oriented liquid jets and/or an impeller; and/or a static mixer, which includes internal baffles. With some additional embodiments: the contaminated water source is added to the source of sulfate ion; the source of sulfate ion is added to the contaminated water source; and/or the contaminated water source and the source of sulfate ion are concurrently added together.

The modified contaminated water source, with some embodiments, is acidic and has a pH that is less than 7.0, such as from 3.5 to 6.9, or from 5.0 to 6.5.

The method of the present invention also includes forming precipitated barium sulfate within the modified contaminated water source, which results in the formation of a further modified contaminated water source. The precipitated barium sulfate can be suspended within the further modified contaminated water source, and/or the precipitated barium sulfate can settle out of the further modified contaminated water source. With some embodiments, the further modified contaminated water source is subjected to agitation, such as by an impeller, and the precipitated barium sulfate is suspended within the further modified contaminated water source.

The step of forming precipitated barium sulfate within the modified contaminated water source, with some embodiments of the present method, further includes: (i) adjusting the pH of the modified contaminated water source to an adjusted pH value of greater than 7.0; and (ii) optionally adding a flocculation aid to the modified contaminated water source. The adjusted pH value, of the modified contaminated water source, with some embodiments, can be from 7.1 to 11.0, or from 7.5 to 10.5, or from 8.0 to 10.0. The adjusted pH value can be determined in accordance with art-recognized methods, such as using a pH meter.

The modified contaminated water source, with some embodiments, is acidic and has a pH that is less than 7.0, such as from 3.5 to 6.9. Correspondingly, and with some embodiments, adjusting the pH of the modified contaminated water source to an adjusted pH value of greater than 7.0, involves combining together a base and the modified contaminated water source. The base can be added to the modified contaminated water source; the contaminated water source can be added to the base; and/or the base and the contaminated water source can be concurrently added together. The base, with some embodiments, can be an alkali metal hydroxide, such as sodium hydroxide (NaOH) and/or potassium hydroxide (KOH). The alkali metal hydroxide can be used in the form of solid alkali metal hydroxide and/or aqueous alkali metal hydroxide.

The step of forming precipitated barium sulfate within the modified contaminated water source, with some embodiments of the present method, can further include, (ii) optionally adding a flocculation aid to the modified contaminated water source. As used herein, the term "flocculation aid" includes "coagulant." The flocculation aid can be selected from art-recognized flocculation aids, such as, but not limited to: polymers, including ionic polymers, such as anionic polymers; and alkali metal carboxy methyl cellulose.

The contaminated water source can include cations other than barium, such as, but not limited to, strontium, calcium, magnesium, and/or iron. Combining together the contaminated water source and the source of sulfate ion can, with some embodiments, result in the formation of other sulfates in addition to barium sulfate, such as, but not limited to, strontium sulfate, calcium sulfate, magnesium sulfate, and/or iron sulfate. With some embodiments, the formation of precipitated barium sulfate is achieved preferentially relative to the formation of other precipitated sulfates, such as precipitated strontium sulfate. While not intending to be bound by any theory, it is believed that barium sulfate forms at a much faster rate than other sulfates, such as strontium sulfate, and correspondingly precipitated barium sulfate forms before the formation of other precipitated sulfates, such as precipitated strontium sulfate.

The method of the present invention further includes isolating precipitated barium sulfate from the further modified contaminated water source, which results in the formation of isolated precipitated barium sulfate.

The step of isolating precipitated barium sulfate, with some embodiments, includes filtering the further modified contaminated water source.

The further modified contaminated water source can be filtered in accordance with art-recognized methods. With some additional embodiments of the present invention, filtering the further modified contaminated water source includes subjecting the further modified contaminated water source to at least one of lamella filtration, dissolved air flotation, and combinations of lamella filtration and dissolved air flotation.

The isolated precipitated barium sulfate, with some embodiments, has a water content of greater than 50 percent by weight, such as from 55 percent by weight to 95 percent by weight, or from 65 percent by weight to 90 percent by weight, or from 70 percent by weight to 85 percent by weight, the percent weights in each case being based on the total weight of the isolated precipitated barium sulfate. Depending on the water content, the isolated precipitated barium sulfate can be in the form of a filter cake or a slurry, with some embodiments.

In accordance with some embodiments of the method of the present invention, the step of isolating precipitated barium sulfate from the further modified contaminated water source, is followed by the step of dewatering the isolated precipitated barium sulfate, thereby forming a low-moisture precipitated barium sulfate.

The step of dewatering the isolated precipitated barium sulfate, with some embodiments, includes, but is not limited to, subjecting the isolated precipitated barium sulfate to at least one of (i) filter pressing, (ii) rotary drum vacuuming, and (iii) centrifuging, which can include combinations of: (i) and (ii); (i) and (iii); (ii) and (iii); or (i), (ii), and (iii).

The low-moisture precipitated barium sulfate formed from the dewatering step, with some embodiments, has a water content of less than or equal to 50 percent by weight, based on total weight of the low-moisture precipitated barium sulfate. The low-moisture precipitated barium sulfate formed from the dewatering step, with some further embodiments, has a water content of from 10 percent by weight to 50 percent by weight, or from 20 percent by weight to 45 percent by weight, or from 25 percent by weight to 35 percent by weight, the percent weights in each case being based on total weight of the low-moisture precipitated barium sulfate.

In accordance with some embodiments of the method of the present invention, the step of dewatering the isolated precipitated barium sulfate, is followed by the step of exposing the low-moisture precipitated barium sulfate to an elevated temperature, thereby forming a refined barium sulfate having a density of at least 4.10 g/ml, and a content of calcium ion ($Ca^{2+}$) of less than or equal to 250 mg/Kg. While not intending to be bound by any theory, it is believed that exposing the low-moisture precipitated barium sulfate to an elevated temperature results in driving (or burning) off organic compounds therein, which correspondingly results in an increase in the density of the resulting refined barium sulfate to a value of at least 4.10 g/m.

The elevated temperature that the low-moisture precipitated barium sulfate is exposed to, is at least one value from 105° C. to 1000° C., such as from 110° C. to 950° C., or from 120° C. to 925° C., with some embodiments. The low-moisture precipitated barium sulfate is exposed to elevated temperature, with some embodiments, for a time of from 1 minute to 24 hours, or from 1 hour to 12 hours, or from 3 hours to 8 hours.

The low-moisture precipitated barium sulfate is exposed to elevated temperature, with some embodiments, in a furnace. The furnace can be a natural gas-fired furnace or an electric furnace, with some embodiments. The furnace, with some embodiments, is a conveyed furnace through-which the low-moisture precipitated barium sulfate continuously conveyed. The furnace, with some further embodiments, is a static or batch furnace, into which the low-moisture precipitated barium sulfate is placed and held, such as in shallow trays, for a period of time.

The refined barium sulfate, with some embodiments, has a density of from 4.10 g/ml to 4.4 g/ml.

The refined barium sulfate, with some embodiments, has a content of calcium ion ($Ca^{2+}$) of less than or equal to 250 mg/Kg, such as from 0 mg/Kg to 249 mg/Kg, or from 0 mg/Kg to 240 mg/Kg. The content of calcium ion ($Ca^{2+}$), of the refined barium sulfate, can be determined in accordance with art-recognized methods, such as by X-ray fluorescence spectrometry, and X-ray powder diffraction.

After exposing the low-moisture precipitated barium sulfate to an elevated temperature, the resulting refined barium sulfate, with some embodiments, has a moisture content of less than or equal to 50 percent by weight, based on the total weight of the refined barium sulfate. The refined barium sulfate, resulting from exposure to elevated temperature, with some embodiments, has a moisture content of from 0 percent by weight to 40 percent by weight, or from 0 percent by weight to 20 percent by weight, the percent weights in each case being based on the total weight of the refined barium sulfate.

With the method of the present invention, the refined barium sulfate is subjected to particle size reduction and/or particle size classification, which results in the formation of a recovered barium sulfate. Particle size reduction of the refined barium sulfate can be achieved using art-recognized size reduction methods, such as, but not limited to, hammer milling, ball milling, jet milling and combinations thereof. Particle size classification of the refined barium sulfate (and/or the refined barium sulfate that has been subjected to particle size reduction) can be achieved in accordance with art-recognized methods, such as, but not limited to, screening with one or more screens (or sieves) each having a designated size opening (or sieve size).

The recovered barium sulfate, with some further embodiments, has a moisture content of less than 50 percent by weight, based on the total weight of the recovered barium sulfate. The recovered barium sulfate, with some embodiments, has a moisture content of from 0 percent by weight to 40 percent by weight, or from 0 percent by weight to 20 percent by weight, the percent weights in each case being based on the total weight of the recovered barium sulfate.

The recovered barium sulfate, with some embodiments, has a particle size of from 6 micrometers to 75 micrometers. The recovered barium sulfate, with some embodiments, has an average (or D50) particle size of from 6 micrometers to 75 micrometers. With some further embodiments, the recovered barium sulfate has a maximum mass fraction of 3 percent by weight, based on total weight of recovered barium sulfate, of particles having a size that is greater than 75 micrometers. With some additional embodiments, the recovered barium sulfate has a maximum mass fraction of 3 percent by weight, based on total weight of recovered barium sulfate, of particles having a size that is less than 6 micrometers. The recovered barium sulfate, with some embodiments has: a maximum mass fraction of 3 percent by weight, based on total weight of recovered barium sulfate, of particles having a size that is greater than 75 micrometers; and a maximum mass fraction of 3 percent by weight, based on total weight of recovered barium sulfate, of particles having a size that is less than 6 micrometers.

In accordance with the method of the present invention, the recovered barium sulfate, has a density of at least 4.10 g/ml, and a content of calcium ion of less than or equal to 250 mg/Kg, including those thresholds and ranges as described previously herein with regard to the refined barium sulfate.

In accordance with some embodiments of the method of the present invention, the step of dewatering the isolated precipitated barium sulfate, so as to form a low-moisture precipitated barium sulfate, is followed by the step of combining the low-moisture precipitated barium sulfate with clean water, so as to form a slurry that includes precipitated barium sulfate. The low-moisture precipitated barium sulfate has, with some embodiments, a water content as discussed previously herein. The slurry that includes precipitated barium sulfate is, with some embodiments, formed by: adding low-moisture precipitated barium sulfate to clean water; adding clean water to the low-moisture precipitated barium sulfate; or concurrently adding together the low-moisture precipitated barium sulfate and the clean water.

The slurry that includes precipitated barium sulfate has, with some embodiments, a content of precipitated barium sulfate that is at least 5 percent by weight, and less than or equal to 45 percent by weight, such as from 20 percent by weight to 40 percent by weight, or from 25 percent by weight to 35 percent by weight, the percent weights in each case being based on the total weight of the slurry.

The clean water, that is combined with said low-moisture precipitated barium sulfate, thereby forming a slurry that includes precipitated barium sulfate, is, with some embodiments, selected from lotic water, city water, well water, deionized water, and combinations thereof.

The method of the present invention includes, with some embodiments, subjecting the slurry that includes precipitated barium sulfate to density separation, thereby forming a refined barium sulfate having a density of at least 4.10 g/ml, and a content of calcium ion of less than or equal to 250 mg/Kg. While not intending to be bound by any theory, it is believed that subjecting the slurry that includes precipitated barium sulfate to density separation results in the separation of organic compounds and low density (or gravity) solids therefrom, and correspondingly results in an increase in the density of the resulting refined barium sulfate to a value of at least 4.10 g/ml.

The step of subjecting the slurry that includes precipitated barium sulfate to density separation, with some embodiments, includes passing the slurry that includes precipitated barium sulfate through at least one spiral separator, such as at least one wet spiral separator. Each spiral separator separates the precipitated barium sulfate based, at least in part, on the density of the precipitated barium sulfate. With some embodiments, and for purposes of non-limiting illustration, as the slurry that includes barium sulfate passes down a spiral separator, higher density precipitated barium sulfate particles move towards the center of the spiral separator, while lower density precipitated barium sulfate particles move or stay towards the outside of the spiral separator. At or near the bottom of the spiral separate, higher density and lower density precipitated barium sulfate particles can be physically separated from each other, such as by one or more adjustable bars.

The refined barium sulfate resulting from the density separation step, with some embodiments, has a moisture content of less than or equal to 70 percent by weight, based on total weight of the refined barium sulfate. The refined barium sulfate resulting from density separation, with some embodiments, has a moisture content of from 0 percent by weight to 70 percent by weight, or from 0 percent by weight to 50 percent by weight, the percent weights in each case being based on the total weight of the refined barium sulfate.

With some embodiments, the refined barium sulfate resulting from the density separation step, is optionally subjected to a drying step prior to the particle size reduction and/or particle size classification step. The optional drying step, with some embodiments, includes exposing the refined barium sulfate to elevated temperature, such as from 105° C. to 350° C., in a furnace, under batch and/or continuous conditions. The optional drying step is employed, with some embodiments, for purposes of reducing the moisture content of the refined barium sulfate, such as to a level that is less than 50 percent by weight, or from 0 percent by weight to 40 percent by weight, or from 0 percent by weight to 20 percent by weight, the percent weights in each case being based on the total weight of the refined barium sulfate.

The refined barium sulfate resulting from the density separation step, with some embodiments, is subjected to particle size reduction and/or particle size classification, thereby forming a recovered barium sulfate. The recovered barium sulfate, and the particle size reduction and particle size classification steps, are each as described previously herein.

With some embodiments of the present invention, the step of forming precipitated barium sulfate within the modified contaminated water source, so as to form a further modified contaminated water source, is followed by the step of isolating precipitated barium sulfate from the further modified contaminated water source, thereby forming a slurry that includes isolated precipitated barium sulfate. The step of isolating the precipitated barium sulfate from the further modified contaminated water source is, with some embodiments, conducted as described previously herein, such as by filtering the further modified contaminated water source, but so as to result in the formation of a slurry that includes isolated precipitated barium sulfate. For purposes of non-limiting illustration, in the case of filtering, and in accordance with some embodiments, a lower (or less) amount of water is passed through the filter, which results in the formation of a slurry that includes isolated precipitated barium sulfate.

The slurry that includes isolated precipitated barium sulfate, with some embodiments, has a content of precipitated barium sulfate as described previously herein, such as a content of precipitated barium sulfate that is at least 5 percent by weight, and less than or equal to 45 percent by weight, such as from 20 percent by weight to 40 percent by weight, or from 25 percent by weight to 35 percent by weight, the percent weights in each case being based on the total weight of the slurry.

The slurry that includes isolated precipitated barium sulfate, with some embodiments, is next subjected to density separation, which results in the formation of high gravity precipitated barium sulfate. The high gravity precipitated barium sulfate, with some embodiments, has a density of at least 4.10 g/ml, such as from 4.10 g/ml to 4.5 g/ml, or from 4.15 g/ml to 4.39 g/ml.

The high gravity precipitated barium sulfate, with some embodiments, contains precipitated barium sulfate in an amount of less than or equal to 5 percent by weight, such as from 20 percent by weight to 40 percent by weight, or from 25 percent by weight to 35 percent by weight.

With some embodiments, the density separation step includes passing the slurry that includes isolated precipitated barium sulfate through at least one spiral separator, such as described previously herein.

The high gravity precipitated barium sulfate, with some embodiments, is next subjected to dewatering, thereby forming a refined barium sulfate having a density of at least 4.10 g/ml, and a content of calcium ion of less than or equal to 250 mg/Kg. The refined barium sulfate is, with some embodiments, as described previously herein.

The refined barium sulfate resulting from the dewatering step, with some embodiments, has a moisture content of less than or equal to 70 percent by weight, based on total weight of the refined barium sulfate. The refined barium sulfate resulting from dewatering, with some embodiments, has a moisture content of from 0 percent by weight to 70 percent by weight, or from 0 percent by weight to 50 percent by weight, the percent weights in each case being based on the total weight of the refined barium sulfate.

With some embodiments, the refined barium sulfate resulting from the dewatering step, is optionally subjected to a drying step prior to the particle size reduction and/or particle size classification step. The optional drying step, with some embodiments, includes exposing the refined barium sulfate to elevated temperature, such as from 105° C. to 350° C., in a furnace, under batch and/or continuous conditions. The optional drying step is employed, with some embodiments, for purposes of reducing the moisture content of the refined barium sulfate, such as to a level that is less than 50 percent by weight, or from 0 percent by weight to 40 percent by weight, or from 0 percent by weight to 20 percent by weight, the percent weights in each case being based on the total weight of the refined barium sulfate.

The refined barium sulfate, with some embodiments, is next subjected to particle size reduction and/or particle size classification, thereby forming a recovered barium sulfate. The recovered barium sulfate, and particle size reduction and particle size classification steps are each as described previously herein.

The refined and recovered barium sulfate resulting from the method of the present invention can be used in a number of applications including, but not limited to, drilling mud compositions, coating compositions, thermoplastic molding compositions, thermosetting molding compositions, and medical applications, such as in X-ray detectable surgical sponges.

The present invention is more particularly described in the following examples, which are intended as illustrative only, since numerous modifications and variations therein will be apparent to those skilled in the art.

EXAMPLES

The following examples provide descriptions of the recovery of barite in accordance with the present invention involving thermal and density separation processes.

Example 1

The present example demonstrates the recovery of barium sulfate (barite) by a thermal process in accordance with some embodiments of the present invention.

At a fixed exploration and production facility in the Northeast Pennsylvania, USA Marcellus Shale formation, impaired water (composed of flowback water and/or produced water) was obtained. The fixed exploration and production facility location had a capacity for storing in excess of 4 MM bbls (476,962 kiloliters) of flowback and production water from the dry gas area within the Marcellus Shale formation. The fixed exploration and production facility was capable of treating impaired water to a certain level of water quality. During such treatment processes the treated water is typically reused for fracturing operations while the waste stream is disposed of in approved landfills. The water treatment process at this fixed exploration and production facility included multiple weir tanks, an over/under clarifier, lamella, and filter press.

With the present example, initial water analysis was conducted using a DR 2800 spectrophotometer, commercially available from HACH Company. The impaired water was determined to have a barium content of approximately 8400 ppm (mg/L) and a pH of 6.4. The flow rate of the impaired water stream was 650 gallons per minute (2461 liters per minute). Sodium sulfate was added to the impaired water stream to initiate the formation of barium sulfate. The sodium sulfate was added at a rate so that the barium level of the effluent water stream was determined to be less than 100 ppm (mg/L). For this example, the barium level of the effluent water stream was determined to be 78 ppm (mg/L). To facilitate precipitation and settling of the precipitated material, a coagulant (polyaluminum hydroxychloride having a pH of about 3.3) and a flocculent (an anionic polyacrylamide emulsion having a pH of about 7.0 when diluted in water) were also added after addition of the sodium sulfate.

The precipitated material was subjected to lamella solids separation, in which the precipitated material was separated from the effluent water stream. The separated solids, having an average solids content of about 30 percent by weight, based on total weight, was next subjected to filter pressing in a 110 cubic foot (3.12 cubic meter) filter press. The filter pressed material, having a cake-like consistency, was determined to have a solids content of 72.3 percent by weight, based on total weight. Samples of the filter pressed material were collected into sampling jars.

Samples of the filter pressed material were subjected to thermal drying in an electric oven. The thermal drying process involved heating the samples of filter pressed material to a temperature of at least 850° C., until a loss of ignition (LOI) was achieved.

The density of samples of filter pressed material was determined prior to and after the thermal drying process (LOI) using a helium pycnometer. The thermally dried (LOI) samples of filter pressed material were also analyzed by Xray diffraction (XRD) using a PANAlytical Xray Diffraction Spectrometer, to determine the presence of Major Compound and Minor Compound (if any). The density and XRD analysis results of two samples 1 and 2 are summarized in the following Table 1.

TABLE 1

| Sample | Density Pre LOI | Density Post LOI | XRD Major Compound | XRD Minor Compound |
|---|---|---|---|---|
| Sample 1 | 3.88 | 4.21 | Barite | None |
| Sample 2 | 3.91 | 4.20 | Barite | None |

The results summarized in the above Table 1 demonstrate that the method of the present invention, involving thermal treatment, provides refined barium sulfate (barite) having a density of at least 4.10 g/ml, barium sulfate as a major compound, and an undetectable content of other (or minor) compounds (by XRD analysis).

Example 2

The present example demonstrates the recovery of barium sulfate (barite) by a mechanical process involving density separation in accordance with some embodiments of the present invention.

Approximately 275 gallons (1041 liters) of water (impaired water), obtained from a fixed exploration and production facility in the southwestern Pennsylvania, USA Marcellus Shale formation, was collected and stored in a standard tote.

A batch treatment process in accordance with the present invention was conducted on the impaired water within the tote, based on initial testing of a sample of impaired water obtained from the tote. The tote was fitted with a small paddle mixer to maintain subsequently formed precipitated materials in suspension. Initial analysis of the impaired water was conducted using a DR 2800 spectrophotometer. It was determined that the impaired water had a barium content of approximately 5600 ppm (mg/L) and a pH of 6.2.

Sodium sulfate was added to the impaired water to initiate the formation of barium sulfate. Sodium Sulfate was added so that the treated impaired water (effluent water) had a barium level of less than 100 ppm (mg/L). Samples of the effluent water were collected using a filtered syringe. The effluent water was determined to have a barium content of 64 ppm (mg/L). To facilitate precipitation and settling of the precipitated material, a coagulant (polyaluminum hydroxychloride having a pH of about 3.3) and a flocculent (an anionic polyacrylamide emulsion having a pH of about 7.0 when diluted in water) were also added after addition of the sodium sulfate.

After the above additions were completed, the contents of the tote were maintained under agitation by the paddle mixer for about 20 minutes, at which point the paddle mixer was turned off and suspended solids within the tote were allowed to settle to the bottom thereof over a period of about 10 minutes. Samples of settled solids (combined density samples) were obtained from the bottom of the tote and placed on filter cloth positioned over 1000 ml beakers for 24 hours to form dewatered combined density samples. The dewatered combined density samples were then dried at a temperature of at least 105° C. to a solids content of 100 percent solids, based on total weight, and are referred to as Pre-Mechanical Process samples. The density of the Pre-Mechanical Process samples was determined using a helium pycnometer. The density (g/ml) results of three Pre-Mechanical Process samples A, B, and C are provided in Table 2 below.

With the paddle mixer re-activated, the settled solids were placed back into suspension, and a 60 gpm (227 liters per minute) pump was used to transfer the contents of the tote to an inclined spiral concentrator/separator device (such as a spiral SP3/SPC-21 separator commercially available from Multotech Process Equipment), which resulted in the formation of three separate streams each having a different density, and which were each separately collected. The stream having the highest density was subjected to further processing as follows. Samples of the collected high density material were placed on filter cloth positioned over 1000 ml beakers for 24 hours, which resulted in the formation of dewatered high density material.

The dewatered high density material was collected and dried at a temperature of at least 105° C. to a solids content of 100 percent by weight, based on total weight, and are referred to as Post-Mechanical Process samples.

The density of the Post-Mechanical Process samples was determined using a helium pycnometer. The Post-Mechanical Process samples were also analyzed by Xray diffraction (XRD) using a PANAlytical Xray Diffraction Spectrometer, to determine the presence of Major Compound and Minor Compound (if any). The density (g/ml) and XRD analysis results of three Post-Mechanical Process samples D, E, and F are provided in the following Table 2.

TABLE 2

| Sample | Density Pre-Mechanical Process | Density Post-Mechanical Process | XRD Major Compound | XRD Minor Compound |
|---|---|---|---|---|
| Sample A | 3.92 | — | — | — |
| Sample B | 3.97 | — | — | — |
| Sample C | 3.96 | — | — | — |
| Sample D | — | 4.28 | Barite | None |
| Sample E | — | 4.27 | Barite | None |
| Sample F | — | 4.27 | Barite | None |

The results summarized in the above Table 2 demonstrate that the method of the present invention, involving density separation, provides refined barium sulfate (barite) having a density of at least 4.10 g/ml, barium sulfate as a major compound, and an undetectable content of other (or minor) compounds (by XRD analysis).

The refined barium sulfate resulting from the procedures described in Examples 1 and 2 can be subjected to further processing, such as particles size reduction and/or particle size classification, so as to result in the formation of recovered barium sulfate.

The present invention has been described with reference to specific details of particular embodiments thereof. It is not intended that such details be regarded as limitations upon the scope of the invention except insofar as to the extent that they are included in the accompanying claims.

What is claimed is:

1. A method of recovering barium sulfate from a contaminated water source, wherein at least a portion of said contaminated water source comprises barium cation, said method comprising:
    (a) providing a source of sulfate ion;
    (b) combining together said contaminated water source and said source of sulfate ion, thereby forming a modified contaminated water source;
    (c) forming precipitated barium sulfate within said modified contaminated water source, thereby forming a further modified contaminated water source, wherein forming precipitated barium sulfate within said modified contaminated water source further comprises:
        adjusting the pH of said modified contaminated water source to an adjusted pH value of greater than 7.0, and
        adding a flocculation aid to said modified contaminated water source;
    (d) isolating precipitated barium sulfate from said further modified contaminated water source, thereby forming isolated precipitated barium sulfate;
    (e) dewatering the isolated precipitated barium sulfate, thereby forming a low-moisture precipitated barium sulfate having a water content of less than or equal to 50 percent by weight, based on total weight of the low-moisture precipitated barium sulfate;
    (f) exposing the low-moisture precipitated barium sulfate to an elevated temperature of at least 105° C., thereby forming a refined barium sulfate having a density of at least 4.10 g/ml, and a content of calcium ion of less than or equal to 250 mg/Kg; and
    (g) subjecting the refined barium sulfate to particle size reduction and/or particle size classification, thereby forming a recovered barium sulfate.

2. The method of claim 1, wherein said contaminated water source is a hydrofracture wastewater.

3. The method of claim 2, wherein at least a portion of said hydrofracture wastewater is selected from hydrofracture flowback water, hydrofracture production water, or combinations thereof.

4. The method of claim 1, wherein said source of sulfate ion is selected from particulate alkali metal sulfate, aqueous alkali metal sulfate, acid mine drainage comprising alkali metal sulfate, or combinations thereof.

5. The method of claim 1, wherein said source of sulfate ion comprises an amount of sulfate ion that is at least sufficient to result in precipitation of at least 90% by weight of barium cation, based on total weight of barium cation present in said contaminated water source, as precipitated barium sulfate.

6. The method of claim 1, wherein isolating precipitated barium sulfate comprises filtering said further modified contaminated water source.

7. The method of claim 6, wherein filtering said further modified contaminated water source comprises subjecting said further modified contaminated water source to at least one of lamella filtration, dissolved air flotation, or combinations of lamella filtration and dissolved air flotation.

8. The method of claim 1, wherein dewatering the isolated precipitated barium sulfate comprises subjecting the isolated precipitated barium sulfate to at least one of filter pressing, rotary drum vacuuming, or centrifuging.

9. The method of claim 1, wherein said elevated temperature that the low-moisture precipitated barium sulfate is exposed to is at least one value from 105° C. to 1000° C.

10. The method of claim 9, wherein said low-moisture precipitated barium sulfate is exposed to said elevated temperature in a furnace.

11. The method of claim 1, wherein said recovered barium sulfate has a particle size of from 6 micrometers to 75 micrometers.

12. The method of claim 1, wherein said recovered barium sulfate has a density of at least 4.10 g/ml, and a content of calcium ion of less than or equal to 250 mg/Kg.

13. The method of claim 1, further comprising the isolated precipitated barium sulfate having a water content of greater than 50 percent by weight.

14. The method of claim 1, further comprising the refined barium sulfate having a density in the range from 4.10 g/ml to 4.4 g/ml.

15. The method of claim 1, further comprising the refined barium sulfate having a content of calcium ion in the range from 0 mg/Kg to 249 mg/Kg.

16. The method of claim 1, further comprising the refined barium sulfate having a content of calcium ion in the range from 0 mg/Kg to 240 mg/Kg.

17. The method of claim 1, further comprising the refined barium sulfate having a moisture content of less than or equal to 50 percent by weight based on a total weight of the refined barium sulfate.

18. The method of claim 1, further comprising the recovered barium sulfate having a moisture content of less than or equal to 50 percent by weight based on a total weight of the recovered barium sulfate.

* * * * *